United States Patent
Song (10) Patent No.: US 12,182,519 B2
(45) Date of Patent: Dec. 31, 2024

(54) SYSTEMS AND METHODS FOR SEMANTIC-BASED PRE-TRAINING FOR DIALOGUE UNDERSTANDING

(71) Applicant: TENCENT AMERICA LLC, Palo Alto, CA (US)

(72) Inventor: Linfeng Song, Bellevue, WA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 267 days.

(21) Appl. No.: 17/887,134

(22) Filed: Aug. 12, 2022

(65) Prior Publication Data

US 2024/0054291 A1   Feb. 15, 2024

(51) Int. Cl.
G06F 40/289   (2020.01)
G06F 40/205   (2020.01)
G06F 40/284   (2020.01)
G06F 40/35    (2020.01)

(52) U.S. Cl.
CPC ............ G06F 40/35 (2020.01); G06F 40/205 (2020.01); G06F 40/284 (2020.01)

(58) Field of Classification Search
CPC ...... G06F 40/35; G06F 40/205; G06F 40/284; G06F 40/30; G06F 16/9024; G06F 16/24522; G06F 16/3329; G06F 16/90332; G06F 16/334; G06F 16/3344; G06F 40/20; G06F 40/237; G06F 16/322; G06F 16/33
See application file for complete search history.

(56) References Cited

U.S. PATENT DOCUMENTS

| | | | |
|---|---|---|---|
| 2019/0213284 A1* | 7/2019 | Anand | G06F 3/0484 |
| 2019/0295537 A1* | 9/2019 | Sapugay | G10L 15/19 |
| 2021/0150152 A1 | 5/2021 | Galitsky | |
| 2021/0374333 A1* | 12/2021 | Song | G06F 40/30 |
| 2021/0406478 A1* | 12/2021 | Klein | G06N 3/045 |
| 2022/0114346 A1 | 4/2022 | Galitsky | |
| 2022/0129770 A1* | 4/2022 | Mihindukulasooriya | G06N 5/02 |
| 2022/0229986 A1* | 7/2022 | Narendula | G06F 40/253 |
| 2022/0229990 A1* | 7/2022 | Turkkan | G06F 40/289 |
| 2022/0229994 A1* | 7/2022 | Sharma | H04L 51/02 |

(Continued)

OTHER PUBLICATIONS

Shou et al, "Amr-da: Data augmentation by abstract meaning representation", May 2022, InFindings of the Association for Computational Linguistics: ACL 2022 May 2022 (pp. 3082-3098). (Year: 2022).*

(Continued)

*Primary Examiner* — Olujimi A Adesanya
(74) *Attorney, Agent, or Firm* — Sughrue Mion, PLLC (57) ABSTRACT

Systems and methods for pre-training a dialogue model with semantic information include: generating a dialogue-level abstract meaning representation (AMR) graph for an input dialogue associated with a speaker, learning core semantic units of the input dialogue based on nodes of the dialogue-level AMR graph, learning semantic relations between words of a sentence of the input dialogue based on edges of the dialogue-level AMR graph, learning an overall agreement of the input dialogue and the dialogue-level AMR graph, and training the dialogue model based on the learned core semantic units, semantic relations between words, and overall agreement.

15 Claims, 4 Drawing Sheets

(56) References Cited

U.S. PATENT DOCUMENTS

2022/0245361 A1* 8/2022 Narendula .......... G06F 16/3344

OTHER PUBLICATIONS

Bai et al, "Semantic representation for dialogue modeling", May 2021, arXiv preprint arXiv:2105.10188. May 21, 2021. pp 1-16 (Year: 2021).*
Dozat et al, "Deep biaffine attention for neural dependency parsing", 2016, arXiv preprint arXiv:1611.01734. Nov. 6, 2016, pp. 1-8 (Year: 2016).*
Qin et al. "ERICA: Improving entity and relation understanding for pre-trained language models via contrastive learning", 2020, arXiv preprint arXiv:2012.15022. Dec. 30, 2020, pp. 1-14 (Year: 2020).*
Hu et al, "Dialogue meaning representation for task-oriented dialogue systems", Apr. 2022, arXiv preprint arXiv:2204.10989. Apr. 23, 2022., pp. 1-14 (Year: 2022).*
Mi et al, "Self-training improves pre-training for few-shot learning in task-oriented dialog systems", 2021, arXiv preprint arXiv:2108.12589. Aug. 28, 2021, pp. 1-12 (Year: 2021).*
Written Opinion dated Sep. 7, 2023 in International Application No. PCT/US23/23843.
International Search Report dated Sep. 7, 2023 in International Application No. PCT/US23/23843.
Claire Bonal et al., "Dialogue-AMR: Abstract Meaning Representation for Dialogue", Proceedings of the 12th Conference on Language Resources and Evaluation (LREC 2020), May 11-16, 2020, pp. 684-695 (10 pages total).

* cited by examiner

FIG. 1

The police could help the house ##wife

FIG. 2a

Tokenized text: The police could help the house ##wife
Masking Prob.: 0.15 0.20 0.20 0.20 0.15 0.20 0.20 0.15

The police could help the house ##wife
(Text)

SYSTEMS AND METHODS FOR SEMANTIC-BASED PRE-TRAINING FOR DIALOGUE UNDERSTANDING

1. Field

Apparatuses and methods consistent with example embodiments of the present disclosure relate to a semantic-based pre-training framework that leverages a deep semantic representation for dialogue pre-training.

2. Description of Related Art

Semantic knowledge has been used for both social chat and task-oriented dialogue systems. For example, PEGASUS is a spoken language interface for on-line air travel planning that transforms a sentence into a semantic frame which is then used for travel planning. As another example, a semantic dialogue model may be used to perform database operations based on semantic features. As yet another example, conversational semantic parsing may be used to integrate intents and slots into a semantic tree and solve intent classification and slot-filling tasks as semantic parsing. Conversational semantic parsing may also be used to represent task-oriented dialogue as a semantic graph to perform dialogue state tracking.

Although incorporating semantic information into dialogue systems has been shown to be helpful for many dialogue tasks, existing models are typically trained on surface dialogue text, and are proven to be weak in understanding the main semantic meaning of a dialogue context. Furthermore, these methods only focus on domain-specific benchmark data, leaving the general potentiality of semantic structures unexploited, and require either human annotations or an external parser to obtain semantic structures, raising costs and/or causing error propagation for real applications.

SUMMARY

According to various embodiments, systems and methods are provided for performing semantic-based pre-training for dialogue understanding.

According to aspects of one or more example embodiments, a method for pre-training a dialogue model with semantic information, performed by at least one processor, includes: generating a dialogue-level abstract meaning representation (AMR) graph for an input dialogue associated with a speaker, learning core semantic units of the input dialogue based on nodes of the dialogue-level AMR graph, learning semantic relations between words of a sentence of the input dialogue based on edges of the dialogue-level AMR graph, learning an overall agreement of the input dialogue and the dialogue-level AMR graph, and training the dialogue model based on the learned core semantic units, semantic relations between words, and overall agreement.

The method includes building utterance-level AMR graphs by independently transforming utterances in the input dialogue into AMR using a pre-trained AMR parser, and connecting the utterance-level AMR graphs with a root node, such that edges of the AMR graph are labeled with the associated speaker.

The method includes identifying one or more semantic-aware units of the input dialogue based on the nodes of the dialogue-level AMR graph, and increasing an attention given by the dialogue model to tokens of the input dialogue that correspond to the one or more semantic-aware units.

The method includes identifying a token of the input dialogue that is aligned with a node of the dialogue-level AMR graph as a semantic-aware unit of the input dialogue.

The method includes assigning a masking probability to each token of the input dialogue, such that the masking probability assigned to a token corresponding to the one or more semantic-aware units is higher than the masking probability assigned to other tokens of the input dialogue.

The method includes projecting the edges of the dialogue-level AMR graph onto a corresponding sentence of the input dialogue according to a node-to-word alignment, and training a predictor to generate the projected edges.

The method includes generating contextualized word hidden states of the input dialogue by using a Transformer encoder, and predicting relations between words based on the hidden states by using a deep biaffine neural parser.

The method includes linearizing the dialogue-level AMR graph and using a pre-trained encoder to transform the linearized AMR into a set of hidden states, and maximizing a similarity score between the set of hidden states and the dialogue-level AMR graph.

The method includes using a cosine similarity as a distance scoring operation, and adopting a contrastive learning framework to train the dialogue model.

According to aspects of one or more example embodiments, an apparatus for pre-training a dialogue model with semantic information includes: a memory storing computer programming code, and at least one processor configured to operate as instructed by the computer programming code, the computer programming code including: generating code configured to cause the at least one processor to generate a dialogue-level abstract meaning representation (AMR) graph for an input dialogue associated with a speaker, learning code configured to cause the at least one processor to learn core semantic units of the input dialogue based on nodes of the dialogue-level AMR graph, learn semantic relations between words of a sentence of the input dialogue based on edges of the dialogue-level AMR graph, learn an overall agreement of the input dialogue and the dialogue-level AMR graph, and training code configured to cause the at least one processor to train the dialogue model based on the learned core semantic units, semantic relations between words, and overall agreement The apparatus includes build code configured to cause the at least one processor to build utterance-level AMR graphs by independently transforming utterances in the input dialogue into AMR using a pre-trained AMR parser; and connect code configured to cause the at least one processor to connect the utterance-level AMR graphs with a root node, wherein edges of the AMR graph are labeled with the associated speaker.

The apparatus includes identify code configured to cause the at least one processor to identify one or more semantic-aware units of the input dialogue based on the nodes of the dialogue-level AMR graph; and attention increasing code configured to cause the at least one processor to increase an attention given by the dialogue model to tokens of the input dialogue that correspond to the one or more semantic-aware units.

The apparatus is configured to cause the at least one processor to identify a token of the input dialogue that is aligned with a node of the dialogue-level AMR graph as a semantic-aware unit of the input dialogue.

The apparatus includes attention increasing code that is configured to cause the at least one processor to assign a masking probability to each token of the input dialogue, such that the masking probability assigned to a token corresponding to the one or more semantic-aware units is higher than the masking probability assigned to other tokens of the dialogue.

The apparatus includes learning code that is configured to cause the at least one processor to: project the edges of the dialogue-level AMR graph onto a corresponding sentence of the input dialogue according to a node-to-word alignment, and train a predictor to generate the projected edges.

The apparatus includes training code is configured to cause the at least one processor to: generate contextualized word hidden states of the input dialogue by using a Transformer encoder, and predict relations between words based on the hidden states by using a deep biaffine neural parser.

The apparatus includes learning code that is configured to cause the at least one processor to: linearize the dialogue-level AMR graph and using a pre-trained encoder to transform the linearized AMR into a set of hidden states, and maximize a similarity score between the set of hidden states and the dialogue-level AMR graph.

The apparatus includes learning code that is configured to cause the at least one processor to: use a cosine similarity as a distance scoring operation, and adopt a contrastive learning framework to train the dialogue model.

According to aspects of one or more example embodiments, a non-transitory computer-readable medium having recorded thereon a computer program which, when executed by a processor, causes the processor to generate a dialogue-level abstract meaning representation (AMR) graph for an input dialogue associated with a speaker, learn core semantic units of the input dialogue based on nodes of the dialogue-level AMR graph, learn semantic relations between words of a sentence of the input dialogue based on edges of the dialogue-level AMR graph, learn an overall agreement of the input dialogue and the dialogue-level AMR graph, and train the dialogue model based on the learned core semantic units, semantic relations between words, and overall agreement.

Additional aspects will he set forth in part in the description that follows and, in part, will be apparent from the description, or may be realized by practice of the presented embodiments of the disclosure.

BRIEF DESCRIPTION OF THE DRAWINGS

Features, aspects and advantages of certain exemplary embodiments of the disclosure will be described below with reference to the accompanying drawings, in which like reference numerals denote like elements, and wherein.

DETAILED DESCRIPTION

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

As set forth above, the related art trains models on surface dialogue text, focusses only on domain-specific benchmark data, and require either human annotations or an external parser. Thus, the related art do not exploit the general potentiality of semantic structures, have increased cost, may cause error propagation, and are proven to be weak in understanding the main semantic meaning of a dialogue context.

Figure 1:
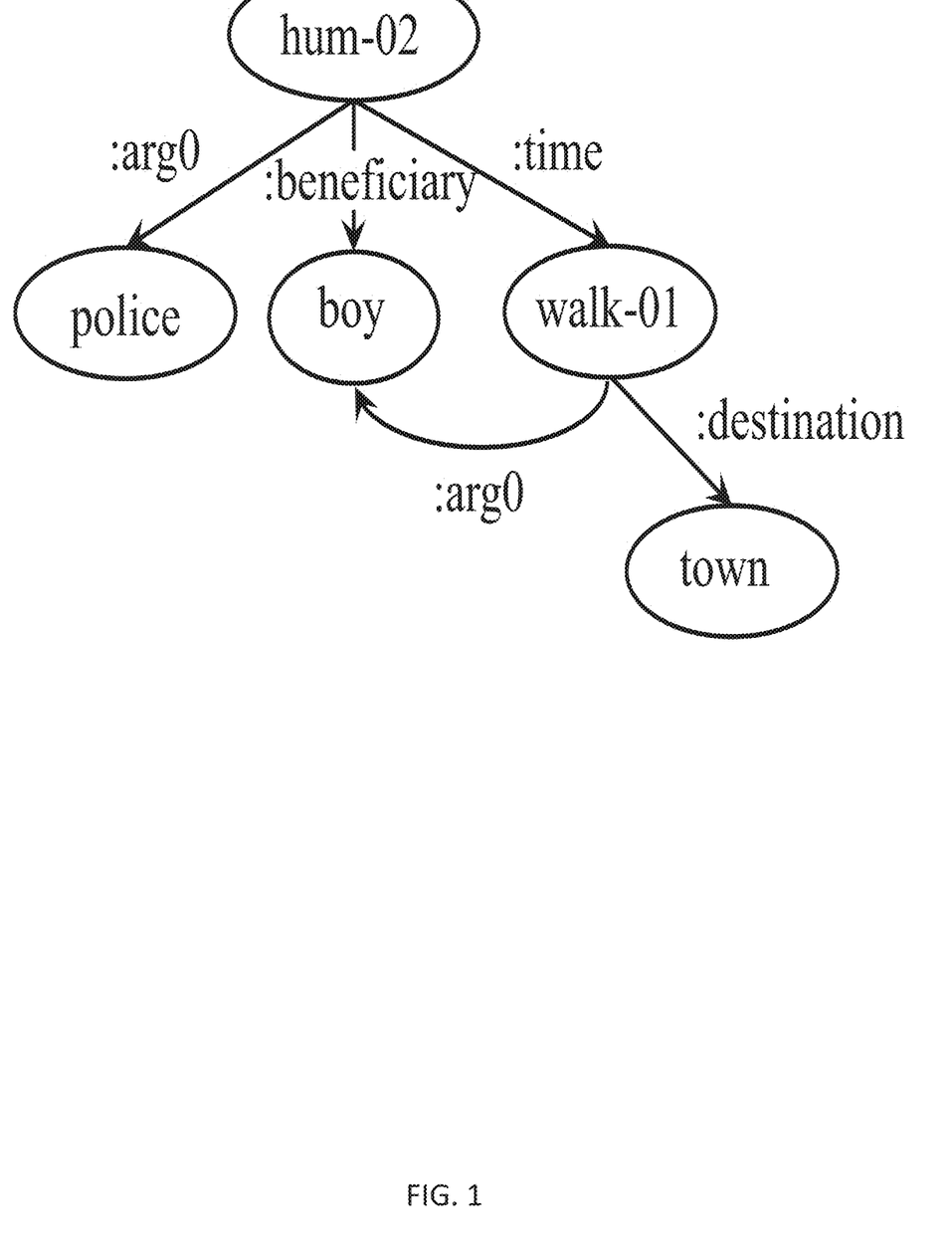
FIG. 1 illustrates an AMR graph, in accordance with one or more example embodiments.

Example embodiments provide a system and method that perform semantic-based pre-training for dialogue understanding, According to an aspect of the disclosure, a semantic-based pre-training framework is provided, that leverages a deep semantic representation for dialogue pre-training. For instance, a semantic-graph-based pre-training (SARA) framework for dialogues may extend a standard pre-training framework by three tasks for learning core semantic units, semantic relations, and the overall semantic representation according to abstract meaning representation (AMR) graphs. The SARA framework may enhance a pre-trained dialogue model with semantic information during pre-training. This may be accomplished by using AMR as explicit semantic knowledge structure. for more fine-grained supervision when pre-training the model, to capture the core semantic information in dialogues during the pre-training. In this way, the model's ability to infer semantic structures from conversations is improved, and the model does not require an external AMR parser in downstream applications, FIG. 1 illustrates an AMR graph, in accordance with one or more example embodiments. As shown in FIG. 1, for the sentence:

"The police hummed to the boy as he walked to town."the AMR highlights core semantic units (e.g., "police", "hum", "boy") in the sentence and connects there with semantic relations (e.g., ":arg0", ":time") using a rooted directed graph.

According to an aspect of the disclosure, AMR graphs may be explicitly leveraged for pre-training a dialogue model. For example, the SARA framework may include three pre-training sub-tasks: 1) semantic-based mask language modeling (MLM), 2) semantic relation prediction, and 3) semantic agreement. The semantic-based mask language modeling sub-task may extend a standard mask language modeling task by increasing attention to core semantic units in a dialogue in order to learn the core semantic units; the semantic relation prediction sub-task may learn the semantic relations between words; and the semantic agreement sub-task may learn an overall agreement of a dialogue and its corresponding AMR graph. In this way, the SARA framework combines the strengths of contextualized representation of pre-trained models and explicit semantic knowledge, while eliminating the requirement of an external semantic parser in downstream applications.

According to an aspect of the disclosure, a pre-trained dialogue model (e.g., a pre-trained Transformer encoder) may be used for continuing to pre-train the model on dialogue(s) in a multitask setting, using AMR(s) of the dialogue(s) as explicit semantic knowledge for the continued pre-training. The multitask setting may include the three pre-training sub-tasks (e.g., semantic-based masking, semantic relation prediction, and semantic agreement).

According to an aspect of the disclosure, a dialogue-level AMR graph may be constructed for an input dialogue. For instance, a plurality of dialogue-level AMR graphs may be constructed for each of a plurality of input dialogues. Each input dialogue may include a plurality of sentences attributed to one or more speakers, The dialogue-level AMR graph may be constructed by building one or more utterance-level AMR graphs and connecting the utterance-level AMR graphs to a root node, where edges are labeled with a corresponding speaker. The utterance-level AMR graphs may be generated by independently transforming utterances into AMR using a pre-trained AMR parser.

For instance, an input dialogue sequence may be denoted as x=[$x_1, x_2, \ldots x_n$], where n is a number of tokens in the dialogue. The corresponding AMR may be a directed acyclic graph G=<V, E>, where V denotes a set of nodes (i.e., AMR concepts and E denotes a set of labeled edges (i.e., AMR relations). An edge may be further represented by a triple <$v_i, r_{ij}, v_j$>, where an edge from node $v_i$ to node $v_j$ has label $r_{ij}$.

According to an aspect of the disclosure, a semantic-guided masking strategy may be implemented by the semantic-based MLM sub-task. The semantic-guided masking strategy may increase the attention given by the model to tokens that contain important semantic information, instead of treating all tokens equally and potentially wasting resources on tokens that provide little signal (e.g., punctuations, stop words). A token that contains important semantic information may be referred to as a semantic-aware unit (i.e., core semantic unit). A token may be identified as a semantic-aware unit when the token is aligned with an AMR node, according to an AMR-to-text alignment.

Figure 2A:
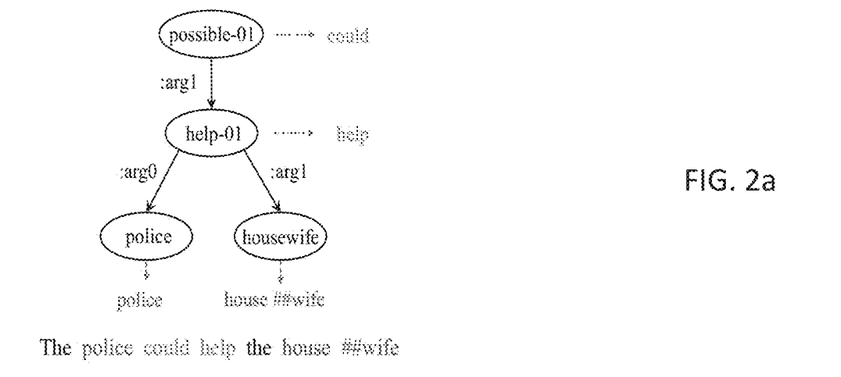
FIG. 2a illustrates another AMR graph, in accordance with one or more example embodiments.

FIG. 2a illustrates another AMR graph, in accordance with one or more example embodiments. The AMR graph in FIG. 2 corresponds to the sentence:

"The police could help the housewife."where the tokens "police", "could", and "help" are aligned with a node of the AMR graph, and may be identified as semantic-aware units.

Figure 2B:
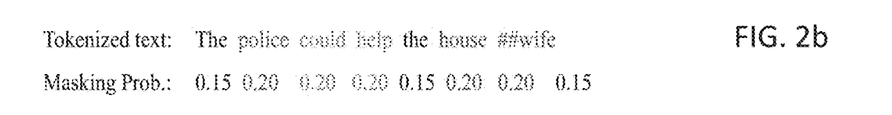
FIG. 2b illustrates a semantic-guided masking strategy, in accordance with one or more example embodiments.

FIG. 2b illustrates a semantic-guided masking strategy, in accordance with one or more example embodiments. As shown in FIG. 2b, the semantic-guided masking strategy assigns a higher masking probability for tokens that contain important semantic information (e.g., "police", "could", "help") compared to the other tokens (e.g. "The", "the").

Since pre-trained models typically use a vocabulary with sub-word units, for an alignment pair <$v_i, x_j$>, the alignment may be extended as <$v_i, \{x_j^1, x_j^2, \ldots, x_j^l\}$>, where the AMR node $v_i$ is aligned with a set of all tokens $\{x_j^1, x_j^2 \ldots x_j^l\}$ which are sub-words of word $w_j$. For example, as shown in FIG. 2a, the AMR node "housewife" is aligned with sub-tokens "house" and "##wife".

The indices of tokens that are identified as semantic-aware units by the semantic-guided masking strategy may be denoted as m'=[$m'_1, m'_2, \ldots, m'_k$], and the semantic-based MLM sub-task may be defined as an optimization of the training objective:

$$L_{sem\_mlm} = -\sum_{i \in m'} \log P(x_i \mid \tilde{x}).$$

According to an aspect of the disclosure, the semantic relation prediction sub-task may be designed to learn semantic relations between words. To this end, the edges of each input AMR graph (corresponding to an input dialogue) may be mapped onto the corresponding sentence according to a node-to-word alignment, before training a predictor to generate the projected edges. For instance, since AMR relations are defined on AMR nodes instead of words in the dialogue text, a node-to-word alignment A may be used to project the AMR edges E onto text with following rules:

$$\hat{r}_{ij} = \begin{cases} r_{i'j'}, & \text{if } x_i \in A(v_{i'}), x_j \in A(v_{j'}) \\ \text{None}, & \text{otherwise} \end{cases}$$

In order to train a predictor to generate the projected edges, a Transformer encoder may be used to first generate contextualized word hidden states h=[$h_1, h_2, \ldots h_n$]. Based on the hidden states, a deep biaffine neural parser may be used to predict relations between words. For instance, to determine whether a directed edge (or arc) from $x_i$ to $x_j$ exists, the biaffine parser may use two separate multi-layer perceptrons (MLPs) (denoted as $MLP^H$ and $MLP^D$) to obtain two lower-dimensional representation vectors for each position, and then calculate scores via a biaffine operation:

$$r_i^H, r_j^D = MLP^H(h_i), MLP^D(h_j),$$

$$s_{ij}^{arc} = \begin{bmatrix} r_j^D \\ 1 \end{bmatrix}^T W^{arc} r_i^H,$$

$$P(y_{ij}^{arc} \mid x) = softmax_j(s_i^{arc}),$$

where $r_i^H$ is the representation vector of $x_i$ as a head word, $r_j^D$ denotes the vector of $x_j$ as a dependent word, and $W^{arc}$ is a parameter matrix, to calculate the probability of assigning a label to the arc (i, j), which is denoted as $P(y_{ij}^{arc})$. Thus, the semantic relation prediction sub-task may be defined as an optimization of the training objective:

$$L_{rel} = -\sum_{\{x_i, \hat{r}_{ij}, x_j\} \in E'} \log P(y_{ij}^{arc} \mid x) P(y_{ij\hat{r}_{ij}}^{label} \mid x),$$

where E' represents the projected AMR edges.

Figure 2C:
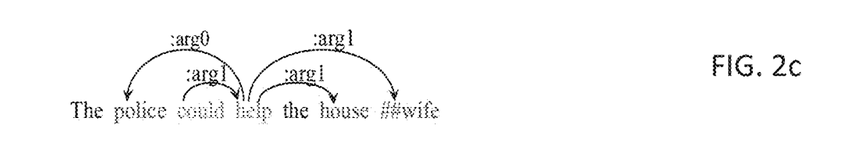
FIG. 2c illustrates a semantic relation prediction, in accordance with one or more example embodiments.

FIG. 2c illustrates a semantic relation prediction, in accordance with one or more example embodiments. As shown in FIG. 2c, the edges of the AMR graph in FIG. 2a are mapped onto tokens of the corresponding sentence according to the node-to-word alignment. For example, the directed edge ":arg0" from node "help-01" to node "police" shown in FIG. 2a is mapped from the token "help" to the token "police" in the corresponding sentence shown in FIG. 2c. As another example, since the word "housewife" in FIG. 2a corresponds to a first token "house" and a second token "##wife", the edge ":arg1" from the node "help-01" to the node "housewife" is mapped from the token "help" to the tokens "house" and "##wife" in the corresponding sentence shown in FIG. 2c.

According to an aspect of the disclosure, the semantic agreement sub-task may be designed to encourage the model to learn the overall agreement of a dialogue and its corresponding AMR graph. For instance, an auxiliary network may be used to encode the AMR, and maximize the similarity score between hidden states of text and the AMR. To this end, AMR graphs may be linearized into a sequence, and a pre-trained encoder may he used to transform the AMR into a set of hidden states. The linearized AMR graph may be defined as g=[$g_1$, $g_2$, . . . , $g_m$], and the vector representation of text and its corresponding AMR may be calculated as:

$h^{text}$=Pooling (TextEnc(x)), $h^{amr}$=Pooling (TextEnc(g)), where TextEnc(x) is a text encoder and TextEnc(g) is a AMR encoder.

Figure 2D:
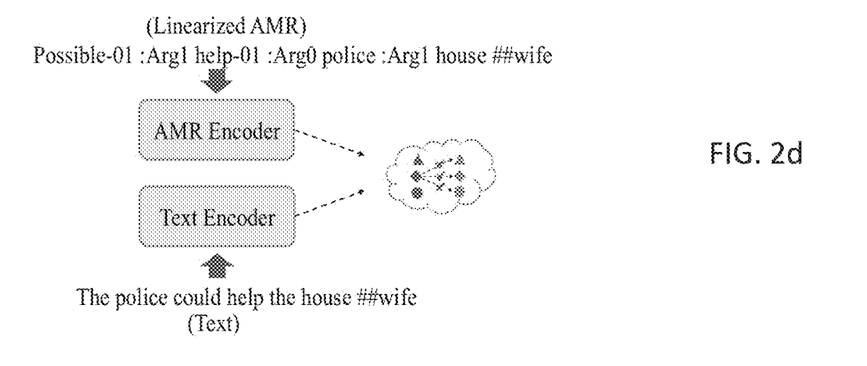
FIG. 2d illustrates a semantic agreement, in accordance with one or more example embodiments.

FIG. 2d illustrates a semantic agreement, in accordance with one or more example embodiments. As shown in FIG. 2d, a linearized AMR graph may be input to an AMR encoder (e.g., TextEnc(g)), and the corresponding text may be input to a Text encoder (e.g., extEnc(x)). The encoders TextEnc(x) and TextEnc(g) may be initialized with the same weights but updated separately during training, and a Pooling operation may be used to reduce the sequence of vectors into one vector. For instance, the hidden state of the first input token may be input into a MLR layer to obtain the "pooled" vector.

According to an aspect of the disclosure, a cosine similarity may be used as a distance scoring operation and a contrastive learning framework may be adopted to train the model with the aim of pulling together semantically close text-AMR pairs and pushing apart unpaired examples. In particular, for a text x, a positive example is its corresponding AMR graph g, and negative examples are the AMR graphs of its neighbor dialogues in the corpus. By letting $h_i^{text}$ and $h_i^{amr}$ denote the representations of the ith example pair in the dataset, the semantic agreement sub-task may be defined as an optimization of the training objective:

$$L_{sim} = -\log \frac{\exp(sim(h_i^{text}, h_i^{amr})/\tau)}{\sum_{j \in N(i)} \exp(sim(h_i^{text}, h_j^{amr})/\tau)},$$

where sim(•,•) denotes the cosine similarity, N(i) collects neighbor index of the i example, and τ>0 denotes the temperature hyper-parameter.

According to an aspect of the disclosure, the model may be trained by optimizing the total loss of the above three sub-tasks:

$L_{total} = L_{sem\_mim} + \alpha L_{rel} + \beta L_{sim}$ where α and β are weighting hyper-parameters for $L_{rel}$ and $L_{sim}$, respectively. In order to lower the computational requirements, a model that has been pre-trained on textual inputs may be used to continue the training.

Figure 3:
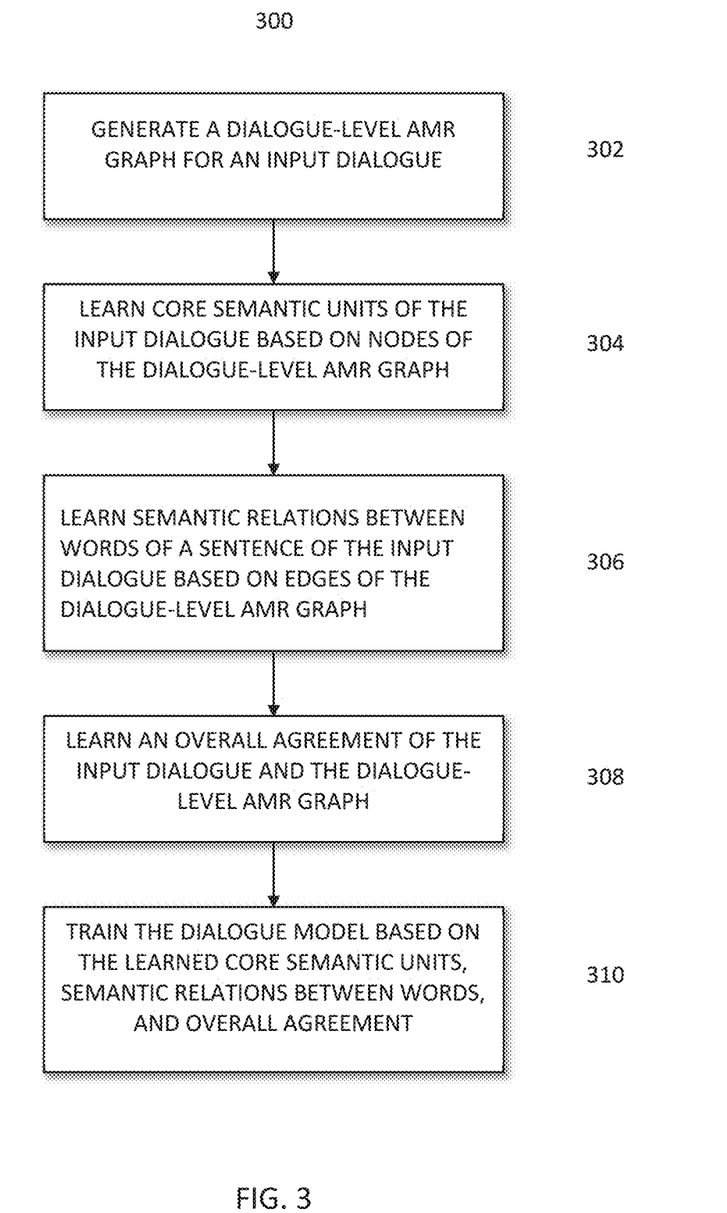
FIG. 3 illustrates a flowchart of a method for pre-training a dialogue model with semantic information, in accordance with one or more example embodiments.

FIG. 3 illustrates a flowchart of a method 300 for pre-training a dialogue model with semantic information, in accordance with one or more example embodiments.

At 302, the method 300 includes generating a dialogue-level abstract meaning representation (AMR) graph for an input dialogue associated with a speaker. For instance, the method 300 may include building utterance-level AMR graphs by independently transforming utterances in the dialogue into AMR using a pre-trained AMR parser, and connecting the utterance-level AMR graphs with a root node, wherein edges of the AMR graph are labeled with the associated speaker.

At 304, the method 300 includes learning core semantic units of the input dialogue based on nodes of the dialogue-level AMR graph. For instance, the method 300 may include identifying one or more semantic-aware units of the input dialogue based on the nodes of the dialogue-level AMR graph, and increasing an attention given by the dialogue model to tokens of the input dialogue that correspond to the one or more semantic-aware units. The method 300 may further include identifying a token of the input dialogue that is aligned with a node of the dialogue-level AMR graph as a semantic-aware unit of the input dialogue. The method 300 may further include assigning a masking probability to each token of the input dialogue, such that the masking probability assigned to a token corresponding to the one or more semantic-aware units is higher than the masking probability assigned to other tokens of the input dialogue.

At 306, the method 300 includes learning semantic relations between words of a sentence of the input dialogue based on edges of the dialogue-level AMR graph. For instance, the method 300 may include projecting the edges of the dialogue-level AMR graph onto a corresponding sentence of the input dialogue according to a node-to-word alignment, and training a predictor to generate the projected edges. The method 300 may further include generating contextualized word hidden states of the input dialogue by using a Transformer encoder, and predicting relations between words based on the hidden states by using a deep biaffine neural parser.

At 308, the method 300 includes learning an overall agreement of the input dialogue and the dialogue-level AMR graph. For instance, the method 300 may include linearizing the dialogue-level AMR graph and using a pre-trained encoder to transform the linearized AMR into a set of hidden states, and maximizing a similarity score between the set of hidden states and the dialogue-level AMR graph, The method 300 may further include using a cosine similarity as a distance scoring operation, and adopting a contrastive learning framework to train the dialogue model.

At 310, the method 300 includes training the dialogue model based on the learned core semantic units, semantic relations between words, and overall agreement. For instance, the method 300 may include optimizing a total loss according to the equation $L_{total}=L_{sem\_mim}+\alpha L_{rel}+\beta L_{sim}$.

Figure 4:
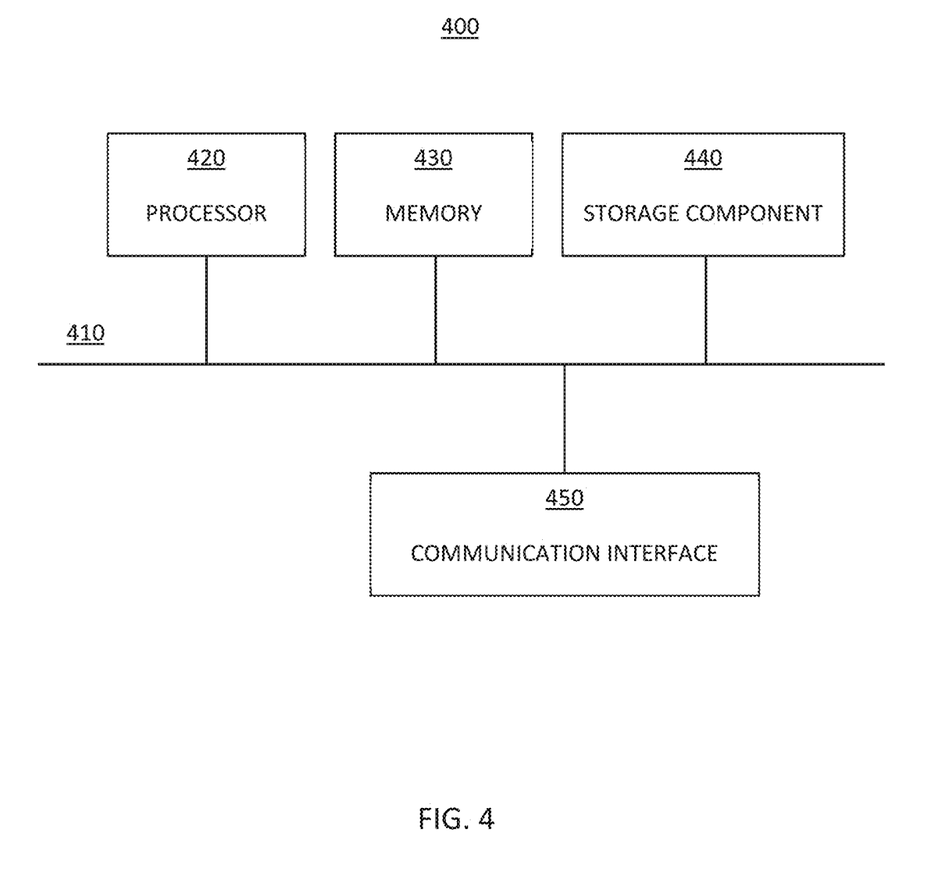
FIG. 4 illustrates a diagram of components of one or more devices, in accordance with one or more example embodiments.

FIG. 4 illustrates a diagram of components of one or more devices, in accordance with one or more example embodiments. Referring to FIG. 4, the device 400 may include a bus 410, a processor 420, a memory 430, a storage component 440, and a communication interface 450. It is understood that one or more of the components may be omitted and/or one or more additional components may be included.

The bus 410 includes a component that permits communication among the components of the device 400. The processor 420 is implemented in hardware, firmware, or a combination of hardware and software. The processor 420 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. The processor 420 includes one or more processors capable of being programmed to carry out operations.

The memory 430 includes a random access memory (RAM), a read only memory (ROM), and/or another type of dynamic or static storage device (e.g., a flash memory, a magnetic memory, and/or an optical memory) that stores information and/or instructions for use by the processor 420.

The storage component 440 stores information and/or software related to the operation and use of the device 400. For example, the storage component 440 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The communication interface 450 includes a transceiver-like component (e.g., a transceiver and/or a separate receiver and transmitter) that enables the device 900 to communicate with other devices, such as via a wired connection, a wireless connection, or a combination of wired and wireless connections. The communication interface 450 may permit device 400 to receive information from another device and/or provide information to another device. For example, the communication interface 450 may include an Ethernet interface, an optical interface, a coaxial interface, an infrared interface, a radio frequency (RF) interface, a universal serial bus (USB) interface, a Wi-Fi interface, a cellular network interface, or the like.

The device 400 may perform one or more processes or operations described herein. The device 400 may perform operations based on the processor 420 executing software instructions stored by a non-transitory computer-readable medium, such as the memory 430 and/or the storage component 440. A computer-readable medium is defined herein as a non-transitory memory device. A memory device includes memory space within a single physical storage device or memory space spread across multiple physical storage devices.

Software instructions may be read into the memory 430 and/or the storage component 440 from another computer-readable medium or from another device via the communication interface 450. When executed, software instructions stored in the memory 430 and/or storage component 440 may cause the processor 420 to perform one or more processes described herein.

Additionally, or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more operations described as being performed by another set of components of device 400.

In various embodiments of the present disclosure, any one of the operations or processes of FIGS. 1-3 may be implemented by or using any one of the elements illustrated in FIG. 4.

According to example embodiments, the device 400 may perform pre-training a dialogue model with semantic information. For instance, the device 400 may generate a dialogue-level AMR graph for an input dialogue associated with a speaker, learn core semantic units of the input dialogue based on nodes of the dialogue-level AMR graph, learn semantic relations between words of a sentence of the input dialogue based on edges of the dialogue-level AMR graph, learn an overall agreement of the input dialogue and the dialogue-level AMR graph, and train the dialogue model based on the learned core semantic units, semantic relations between words, and overall agreement.

The foregoing disclosure provides illustration and description, but is not intended to be exhaustive or o limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the operations/acts specified in the flowchart and/or block diagram block or blocks. These computer readable program instructions may also be stored in a computer readable storage medium that can direct a computer, a programmable data processing apparatus, and/or other devices to operate in a particular manner, such that the computer readable storage medium having instructions stored therein comprises an article of manufacture including instructions which implement aspects of the operation/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the operations/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical operation(s). The method, computer system, and computer readable medium may include additional blocks, fewer blocks, different blocks, or differently arranged blocks than those depicted in the Figures. In some alternative implementations, the operations noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified operations or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method for pre-training a dialogue model with semantic information performed by at least one processor, the method comprising:
   generating a dialogue-level abstract meaning representation (AMR) graph for an input dialogue associated with a speaker;
   learning core semantic units of the input dialogue as a first optimization task based on nodes of the dialogue-level AMR graph, wherein one or more tokens associated with the core semantic units are given more attention that one or more tokens not associated with the one or more core semantic units;
   learning semantic relations between words of a sentence of the input dialogue as a second optimization task based on edges of the dialogue-level AMR graph by projecting the edges of the dialogue-level AMR graph onto a corresponding sentence of the input dialogue according to a node-to-word alignment;

learning an overall agreement of the input dialogue and the dialogue-level AMR graph as a third optimization task by linearizing the dialogue-level AMR graph, using a pre-trained encoder to transform the linearized AMR into a set of hidden states, and maximizing a similarity score between the set of hidden states and the dialogue-level AMR graph; and generating a trained dialogue model based on optimizing a total loss based on the first optimization task, the second optimization task, and the third optimization task and according to equation $$L_{total}=L_{sem\_mim}+\alpha L_{rel}+\beta L_{sim},$$

wherein α is a weighting hyper-parameters for $L_{rel}$, and β is a weighting hyper-parameters parameters for $L_{sim}$, wherein $L_{sim}$ is a first training objective for learning the core semantic units, $L_{rel}$ is a second training objective for learning the semantic relations, and wherein $L_{sim}$ is a third training objective for learning the overall similarity.

2. The method of claim 1, wherein generating the dialogue-level AMR graph for the input dialogue associated with the speaker comprises:

building utterance-level AMR graphs by independently transforming utterances in the input dialogue into AMR using a pre-trained AMR parser; and connecting the utterance-level AMR graphs with a root node, wherein the edges of the dialogue-level AMR graph are labeled with the speaker.

3. The method of claim 1, wherein learning the core semantic units of the input dialogue based on the nodes of the dialogue-level AMR graph comprises:

identifying one or more semantic-aware units of the input dialogue based on the nodes of the dialogue-level AMR graph; and increasing an attention given by the dialogue model to tokens of the input dialogue that correspond to the one or more semantic-aware units.

4. The method of claim 3, wherein identifying the one or more semantic-aware units of the input dialogue based on the nodes of the dialogue-level AMR graph comprises:

identifying a token of the input dialogue that is aligned with a node of the dialogue-level AMR graph as a semantic-aware unit of the input dialogue.

5. The method of claim 3, wherein increasing the attention given by the dialogue model to tokens of the input dialogue that correspond to the one or more semantic-aware units comprises:

assigning a masking probability to each token of the input dialogue, wherein the masking probability assigned to a token corresponding to the one or more semantic-aware units is higher than the masking probability assigned to other tokens of the input dialogue.

6. The method of claim 1, wherein the projecting the edges comprises:

generating contextualized word hidden states of the input dialogue by using a Transformer encoder; and predicting relations between words based on the hidden states by using a deep biaffine neural parser.

7. The method of claim 1, wherein maximizing the similarity score between the set of hidden states and the dialogue-level AMR graph comprises:

using a cosine similarity as a distance scoring operation; and adopting a contrastive learning framework to train the dialogue model.

8. An apparatus for pre-training a dialogue model with semantic information, the apparatus comprising:

a memory storing computer programming code; and at least one processor configured to operate as instructed by the computer programming code, the computer programming code including:

generating code configured to cause the at least one processor to generate a dialogue-level abstract meaning representation (AMR) graph for an input dialogue associated with a speaker;

first learning code configured to cause the at least one processor to determine core semantic units of the input dialogue based on nodes of the dialogue-level AMR graph, wherein one or more tokens associated with the core semantic units are given more attention that one or more tokens not associated with the one or more core semantic units;

second learning code configured to cause the at least one processor to determine semantic relations between words of a sentence of the input dialogue based on edges of the dialogue-level AMR graph by projecting the edges of the dialogue-level AMR graph onto a corresponding sentence of the input dialogue according to a node-to-word alignment;

third learning code configured to cause the at least one processor to determine an overall agreement of the input dialogue and the dialogue-level AMR graph by linearizing the dialogue-level AMR graph, using a pre trained encoder to transform the linearized AMR into a set of hidden states, and maximizing a similarity score between the set of hidden states and the dialogue-level AMR graph; and training code configured to cause the at least one processor to generating a trained dialogue model based on optimizing a total loss based on the first optimization task, the second optimization task, and the third optimization task and according to equation $$L_{total}=L_{sem\_mim}+\alpha L_{rel}+\beta L_{sim},$$

wherein α is a weighting hyper-parameters for $L_{rel}$, and β is a weighting hyper-parameters for $L_{sim}$, wherein $L_{sim}$ is a first training objective for learning the core semantic units, $L_{rel}$ is a second training objective for learning the semantic relations, and wherein $L_{sim}$ is a third training objective for learning the overall similarity.

9. The apparatus of claim 8, wherein the generating code comprises:

build code configured to cause the at least one processor to build utterance-level AMR graphs by independently transforming utterances in the input dialogue into AMR using a pre-trained AMR parser; and connect code configured to cause the at least one processor to connect the utterance-level AMR graphs with a root node, wherein the edges of the dialogue-level AMR graph are labeled with the speaker.

10. The apparatus of claim 8, wherein the learn code comprises:

identify code configured to cause the at least one processor to identify one or more semantic-aware units of the input dialogue based on the nodes of the dialogue-level AMR graph; and attention increasing code configured to cause the at least one processor to increase an attention given by the dialogue model to tokens of the input dialogue that correspond to the one or more semantic-aware units.

11. The apparatus of claim 10, wherein the identify code is configured to cause the at least one processor to identify a token of the input dialogue that is aligned with a node of the dialogue-level AMR graph as a semantic-aware unit of the input dialogue.

12. The apparatus of claim 10, wherein the attention increasing code is configured to cause the at least one processor to assign a masking probability to each token of the input dialogue, wherein the masking probability assigned to a token corresponding to the one or more semantic-aware units is higher than the masking probability assigned to other tokens of the dialogue.

13. The apparatus of claim 8, wherein the training code is configured to cause the at least one processor to:
  generate contextualized word hidden states of the input dialogue by using a Transformer encoder; and
  predict relations between words based on the hidden states by using a deep biaffine neural parser.

14. The apparatus of claim 8, wherein the third learning code is configured to cause the at least one processor to:
  use a cosine similarity as a distance scoring operation; and
  adopt a contrastive learning framework to train the dialogue model.

15. A non-transitory computer-readable recording medium having recorded thereon a computer program which, when executed by a processor, causes the processor to:
  generate a dialogue-level abstract meaning representation (AMR) graph for an input dialogue associated with a speaker;
  determine core semantic units of the input dialogue based on nodes of the dialogue-level AMR graph, wherein one or more tokens associated with the core semantic units are given more attention that one or more tokens not associated with the one or more core semantic units;
  determine semantic relations between words of a sentence of the input dialogue based on edges of the dialogue-level AMR graph by projecting the edges of the dialogue-level AMR graph onto a corresponding sentence of the input dialogue according to a node-to-word alignment;
  determine an overall agreement of the input dialogue and the dialogue-level AMR graph by linearizing the dialogue-level AMR graph, using a pre-trained encoder to transform the linearized AMR into a set of hidden states, and maximizing a similarity score between the set of hidden states and the dialogue-level AMR graph; and
  generate a trained dialogue model based on the optimizing a total loss based on the first optimization task, the second optimization task, and the third optimization task and according to equation $$L_{total}=L_{sem\_mim}+\alpha L_{rel}+\beta L_{sim},$$

wherein $\alpha$ is a weighting hyper-parameters for $L_{rel}$, and $\beta$ is a weighting hyper-parameters for $L_{sim}$,
wherein $L_{sim}$ is a first training objective for learning the core semantic units, $L_{rel}$ is a second training objective for learning the semantic relations, and wherein $L_{sim}$ is a third training objective for learning the overall similarity.

* * * * *